H. E. WOOLERY.
PISTON RING.
APPLICATION FILED OCT. 28, 1914.
1,127,711.
Patented Feb. 9, 1915.
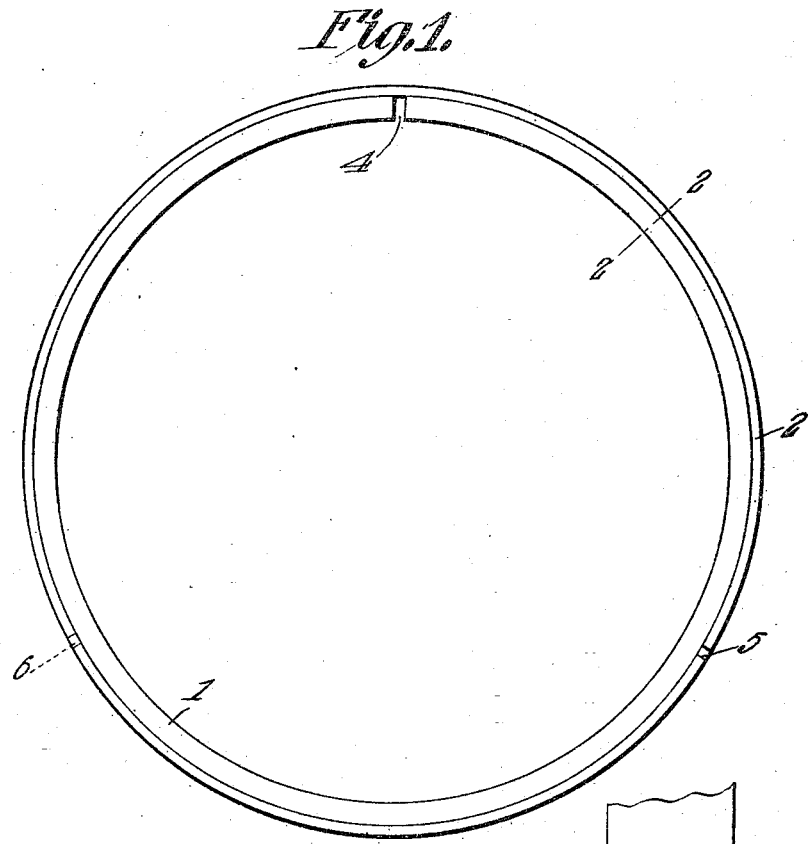
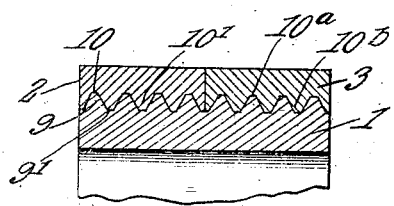
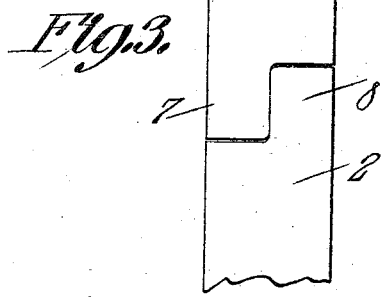
Witnesses
H. E. Woolery,
Inventor

UNITED STATES PATENT OFFICE.

HORACE E. WOOLERY, OF FAIRMONT, MINNESOTA.

PISTON-RING.

1,127,711.

Specification of Letters Patent.

Patented Feb. 9, 1915.

Application filed October 28, 1914. Serial No. 869,039.

*To all whom it may concern:*

Be it known that I, HORACE E. WOOLERY, a citizen of the United States, residing at Fairmont, in the county of Martin and State of Minnesota, have invented a new and useful Piston-Ring, of which the following is a specification.

The present invention relates to improvements in piston rings, one object of the invention, being the provision of a ring composed of a plurality of annuli, the main or bull ring member of which is of a width sufficient to accommodate upon the circumference thereof, the two outer rings which lie side by side, the meeting portions of the respective rings being grooved circumferentially and parallel to interfit, to prevent undue wear between the bull ring and the outer sections as is the case, where the outer sections fit upon the smooth outer surface of the bull ring.

A further object of the present invention, is the provision of a piston ring composed of three annuli, the split portions of which alternate to be out of line to thus prevent the passage of gas between the sections, the said annuli being so disposed relatively to each other as to be permitted circumferential but no lateral or transverse movements due to the peculiar grooving and connecting means therebetween.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a plan view of a complete ring made according to and embodying the present invention. Fig. 2 is a section taken on line 2—2 of Fig. 1. Fig. 3 is a plan view taken from the outer side of one ring showing the preferred form of joint at the opening thereof.

Referring to the drawings, the numeral 1 designates the inner annulus, or what is commonly termed, the bull ring of the piston ring, while disposed exteriorly thereof, are the two outer cylinder contacting annuli 2 and 3. The joints 4, 5 and 6, as illustrated in full and dotted lines in Fig. 1, are disposed to be out of alinement so that a tight joint is effected where the respective annuli 2 and 3 come in contact with the cylinder of the engine. These joints as shown in Fig. 3, are constructed so as to have the interlocking projecting portions 7 and 8 which thus provide a staggered joint to prevent the easy passage of gas therebetween.

In order that the sections or annuli may be connected together or assembled as shown in Fig. 2, the outer circumference of the annulus 1 is provided with the parallel ridges 9, which define the parallel grooves 9', the walls of such ridges and grooves being inclined or as illustrated substantially truncated triangles. The annulus 2 is provided with the corresponding grooves 10 and ridges 10', to coöperate with the respective ridges and grooves 9 and 9' of the annulus 1, while the annulus 3 is provided with the corresponding grooves 10$^a$ and the ridges 10$^b$. It will thus be evident that when the parts are assembled, as illustrated in Fig. 2, that although the annuli 2 and 3 may have a slight circumferential sliding movement relatively to the annulus 1, they have no lateral movement and therefore are prevented from sliding in that direction that tends to wear the surfaces between the annuli 2 and 3 and the annulus 1. It has also been found that the grooves and circumferential ridges should be preferably truncated triangles in cross section or similar to screw threads, but instead of being helical they are made circumferentially parallel so that when the sections or annuli are once assembled, they are maintained against lateral or transverse movement.

What is claimed is:

1. A piston ring, composed of an inner annulus, and two outer annuli disposed thereupon, the combined width of which is substantially the width of the inner annulus, the adjacent faces of the inner annulus and the outer annuli being provided each with a plurality of interlocking circumferential means to prevent lateral or transverse displacement of one relatively to the other.

2. A piston ring, composed of an inner annulus, and two outer annuli disposed thereupon, the combined width of which is substantially the width of the inner annulus, the outer circumferential face of the inner annulus and the inner face of the outer annuli each being provided with a plurality of coöperative circumferentially parallel grooves which interlock to hold the annuli against lateral or transverse movement.

3. A piston ring, comprising an inner annulus, two outer annuli disposed thereupon, the combined width of which is substantially the width of the inner annulus, the outer face of the inner annulus and the inner faces of the outer annuli being provided with inter-engaging circumferentially parallel grooves, each groove of which is substantially a truncated triangle in cross section.

In testimony that I claim the foregoing as my own, I have hereto affixed my signature in the presence of two witnesses.

HORACE E. WOOLERY.

Witnesses:
 H. P. EDWORDS,
 G. F. ANDERSON.